(12) United States Patent
Carlen et al.

(10) Patent No.: US 7,995,327 B2
(45) Date of Patent: Aug. 9, 2011

(54) FILM, A CAPACITOR, A VOLTAGE TRANSFORMER AND A METHOD OF USING A CAPACITOR

(75) Inventors: Martin Carlen, Niederrohrdorf (CH); Thomas Christen, Birmenstorf (CH); Henning Fuhrmann, Zürich (CH)

(73) Assignee: ABB Research Ltd, Zurich (CH)

( * ) Notice: Subject to any disclaimer, the term of this patent is extended or adjusted under 35 U.S.C. 154(b) by 408 days.

(21) Appl. No.: 12/213,691

(22) Filed: Jun. 23, 2008

(65) Prior Publication Data
US 2009/0009928 A1  Jan. 8, 2009

Related U.S. Application Data

(63) Continuation of application No. PCT/CH2006/000723, filed on Dec. 20, 2006.

(30) Foreign Application Priority Data

Dec. 23, 2005  (EP) .................... 05405720

(51) Int. Cl.
*H01G 9/042* (2006.01)
*H01G 9/045* (2006.01)

(52) U.S. Cl. .................... 361/329; 361/301.5

(58) Field of Classification Search .......... 361/273, 361/301.5, 328, 329, 323
See application file for complete search history.

(56) References Cited

U.S. PATENT DOCUMENTS

| | | | |
|---|---|---|---|
| 2,301,882 A | 11/1942 | Kappeler | |
| 3,508,128 A | 4/1970 | Allison | |
| 5,696,663 A * | 12/1997 | Unami et al. | 361/305 |
| 6,919,717 B2 * | 7/2005 | Ghassemi | 324/126 |

FOREIGN PATENT DOCUMENTS

| | | |
|---|---|---|
| DE | 897 741 | 11/1953 |
| DE | 31 48 360 A1 | 6/1983 |
| EP | 0 225 822 A1 | 6/1987 |
| EP | 1 329 915 A1 | 7/2003 |
| EP | 1 341 195 A1 | 9/2003 |
| FR | 1 588 904 A | 3/1970 |
| GB | 1 216 728 | 12/1970 |
| JP | 05326322 A * | 12/1993 |

OTHER PUBLICATIONS

PCT/ISA/237.
European Search Report.

* cited by examiner

*Primary Examiner* — Eric Thomas
(74) *Attorney, Agent, or Firm* — Buchanan Ingersoll & Rooney PC (57) ABSTRACT an exemplary film includes a base having an electrically insulating polymer which carries on one or both surfaces a sequence of electrically conductive coated areas which are separated by non-coated interstices. The film, which can include a superposition of films arranged one above another, can be shaped to form a capacitor. The capacitor can include a plurality of parallel electrodes which are insulated from each other. Each electrode can include one or more electrode layers formed by the coated areas that are separated by dielectric layers formed by sections of the base.

28 Claims, 4 Drawing Sheets

FILM, A CAPACITOR, A VOLTAGE TRANSFORMER AND A METHOD OF USING A CAPACITOR

RELATED APPLICATIONS

This application claims priority under 35 U.S.C. §119 to EP Application 05405720.3 filed in Europe on Dec. 23, 2005, and as a continuation application under 35 U.S.C. §120 to PCT/CH2006/000723 filed as an International Application on Dec. 12, 2006 designating the U.S., the entire contents of which are hereby incorporated by reference in their entireties.

TECHNICAL FIELD

The disclosure concerns a film and a capacitor comprising a film according to the disclosure. Capacitors of this type are employed in MV and HV electrical installations. For example, a capacitor according to the disclosure can be part of a voltage transformer where it is employed as a high voltage capacitor in series with a low voltage capacitor. The disclosure also concerns a method of using a capacitor according to the disclosure.

BACKGROUND

Films of the generic type with a polymer base and at least one longitudinally contiguous strip of electrically conductive coating, in particular, metal, are well known, see, e.g., EP 1 329 915 A1. According to this document, two such films are wound into a coil together to form a capacitor.
Similar capacitors where two or three such films are arranged one immediately above the other and wound together are known from EP 1 341 195 A1. Part of the electrically conductive coatings serve as electrically unconnected floating electrodes which subdivide the potential drop between two electrodes connected to opposite leads. Subsequent electrodes are always separated by an electrically insulating base. At least part of the coatings form tracks arranged side by side on the base of the respective film. However, the tracks are contiguous tracks, i.e. uninterrupted in the longitudinal direction. Also, two of the tracks in question each extend to one of the lateral edges of the film so they can be contacted there. Voltage differences and consequent electrical fields between tracks which are either arranged side by side at the same surface of the film or at opposite surfaces separated by the electrically insulating base of the film are of the same order of magnitude as the total voltage drop. As a consequence, the films in question and capacitors made from them are suitable for relatively low voltage applications only.

SUMMARY

Exemplary embodiments disclosed herein can provide a generic film suitable for formation of capacitors and similar devices which can, for example, withstand high voltages without a risk of surface flashovers or partial breakdowns.

A voltage transformer is disclosed comprising a high voltage capacitor and a low voltage capacitor series-connected to the high voltage capacitor, wherein the high voltage capacitor includes: at least one film with a base, which base comprises an electrically insulating polymer, and a partial coating of electrically conductive material, the partial coating being arranged on a first surface of the base, and the film being windable or foldable in a longitudinal direction, wherein the coating forms on the first surface at least one sequence of conductively coated areas, each of the coated areas being spaced from lateral edges of the base, the conductively coated areas following upon each other in the longitudinal direction of the film separated by non-coated interstices; subsequent film layers of at least one wound or folded film arranged one on top of another, with conductively coated areas forming parallel electrode layers separated by non-coated interstices, and with the electrode layers forming a plurality of electrodes which are electrically insulated from each other; a winding of the at least one film, with the subsequent film layers arranged one on top of another being formed by subsequent turns of the winding; and wherein the low voltage capacitor includes at least two films, each with a base comprising an electrically insulating polymer and an electrically conductive solid foil arranged on top of the base, each solid foil being electrically insulated by the base; wherein the low voltage capacitor coaxially surrounds the high voltage capacitor.

A voltage transformer is disclosed comprising a high voltage capacitor and a low voltage capacitor series-connected to the high voltage capacitor, wherein the high voltage capacitor includes: at least one film with a base, which base comprises an electrically insulating polymer, and a partial coating of electrically conductive material, the partial coating being arranged on a first surface of the base, and the film being windable or foldable in a longitudinal direction, wherein the coating forms on the first surface at least one sequence of conductively coated areas, each being spaced from lateral edges of the base, the conductively coated areas following upon each other in the longitudinal direction of the film separated by non-coated interstices; wherein subsequent film layers of at least one wound or folded film are arranged one on top of another, with the conductively coated areas, forming parallel electrode layers separated by non-coated interstices, and with the electrode layers forming a plurality of electrodes which are electrically insulated from each other; and wherein the low voltage capacitor and the high voltage capacitor are arranged immediately adjacent to each other.

Method of transforming a voltage via a high voltage capacitor, comprising: winding or folding at least one film with a base in a longitudinal direction, which base comprises an electrically insulating polymer, and a partial coating of electrically conductive material, the partial coating being arranged on a first surface of the base, wherein the coating forms on the first surface at least one sequence of conductively coated areas, each of the coated areas being spaced from lateral edges of the base, the conductively coated areas following upon each other in the longitudinal direction of the film separated by non-coated interstices; and forming a winding of the at least one film, with subsequent film layers arranged one on top of another being formed by subsequent turns of the winding, the subsequent film layers of the at least one wound or folded film being arranged one on top of another, with conductively coated areas forming parallel electrode layers separated by non-coated interstices, and with the electrode layers forming a plurality of electrodes which are electrically insulated from each other; wherein a potential difference between consecutive electrodes of the high voltage capacitor is below a minimum of the Paschen curve.

A voltage transformer is disclosed comprising: a first capacitor including: a winding of a film having a base with an electrically insulating polymer and a partial coating of electrically conductive material, the partial coating being arranged on a first surface of the base to form at least one sequence of conductively coated areas, each being spaced from lateral edges of the base, the conductively coated areas being separated from one another by non-coated interstices; and additional film layers with conductively coated areas forming parallel electrode layers separated by non-coated interstices and electrically insulated from each other; and a second capacitor of low voltage, series-connected to the first capacitor and coaxially surrounding the first capacitor, the second capacitor including: at least two films, each with a base having an electrically insulating polymer and an electrically conductive solid foil arranged on the base, the solid foils of the at least two films being electrically insulated from each other.

BRIEF DESCRIPTION OF THE DRAWINGS

In the following, the disclosure will be explained in more detail with reference to the following figures which show exemplary embodiments, wherein FIG. 1 schematically shows a partial top view of a polymer film according to an exemplary embodiment;

FIG. 5b schematically shows a cutout from a section of a capacitor wound from the film according to FIG. 5a;

FIG. 6b schematically shows a cutout from a section of a capacitor wound from the film according to FIG. 6a;

FIG. 7b schematically shows a cutout from a section of a capacitor wound from the superposition of films according to FIG. 7a; and FIG. 8 schematically shows a cutout from a section of an exemplary capacitor zigzag-folded from a film similar to the film according to FIG. 6a.

DETAILED DESCRIPTION

An exemplary capacitor is disclosed which essentially consists of a film as disclosed herein, or of several such films. Capacitors of high quality and reliability can be produced from such films in relatively simple and cost-saving ways. In particular, time-consuming drying and impregnation, and in some cases curing steps used for the production of known capacitors, can be avoided.

In an exemplary capacitor according to the disclosure, an electric field between opposite contacts can be controlled with great precision and, in particular, large potential differences between them can be subdivided in a controlled manner into a relatively large number of small potential differences between mutually electrically insulated electrodes.

An exemplary advantage of a capacitor according to the disclosure is that an electrically conductive coating tends to evaporate around a location of a partial breakdown; that is, the capacitor is self-healing.

A capacitive voltage transformer is disclosed which can be of high accuracy and reliability which is, at the same time, relatively easy to produce. An exemplary capacitor is employed as a high voltage capacitor where its capacity of withstanding high voltage differences is used as an advantage while its relatively low capacitance does not constitute a drawback.

An exemplary film according to the disclosure can be made very thin and therefore a large number of electrodes can be provided in a gap of a given width. An exemplary capacitor as disclosed herein can be used in such a way that potential differences between subsequent electrodes are fairly small, in particular, smaller than the minimum voltage of the Paschen curve. In this case, no partial discharges will occur even where the capacitor contains voids or gas inclusions.

Figure 1:
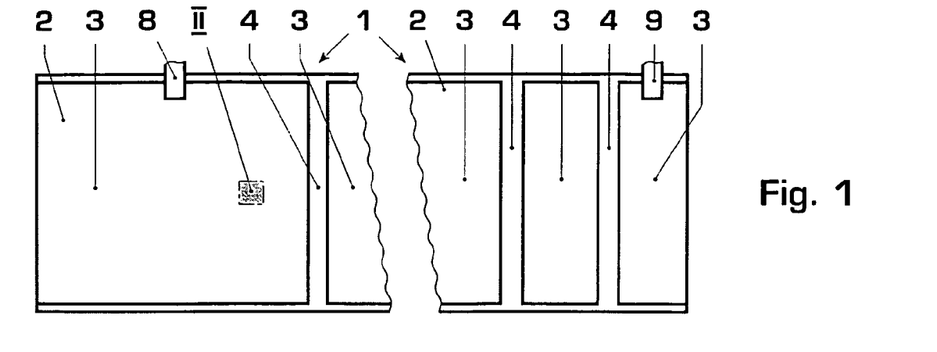
Figure 3:
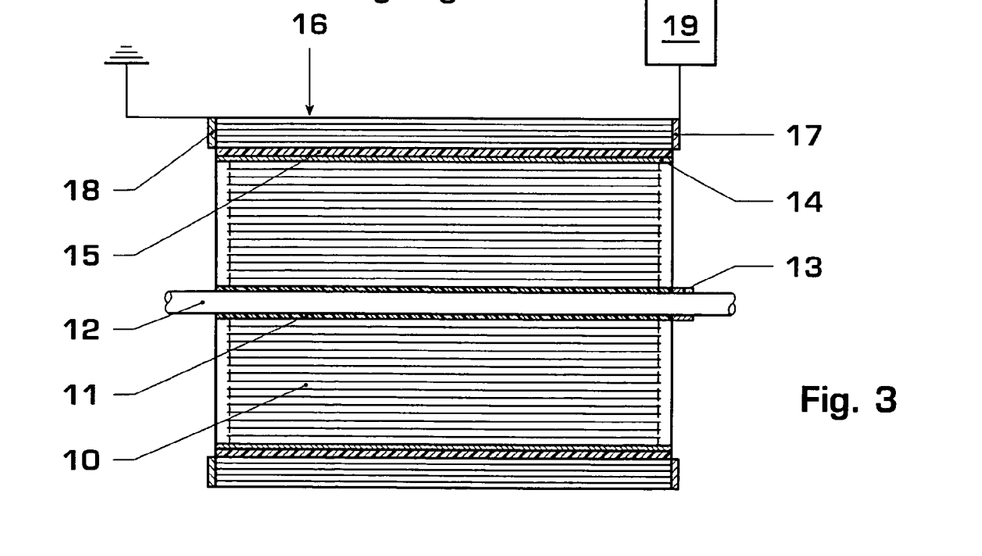
FIG. 3 shows an axial section through a voltage transformer according to an exemplary embodiment.
Figure 4:
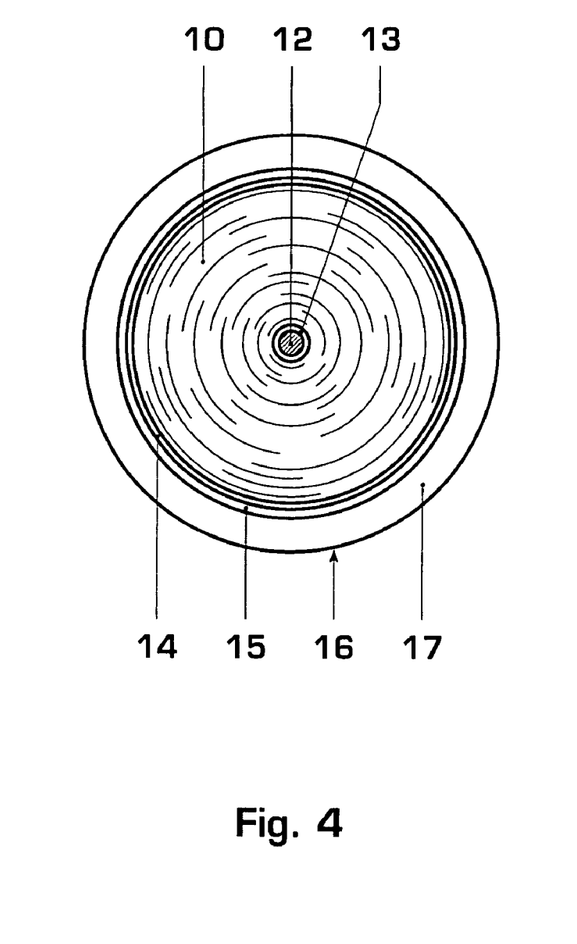
FIG. 4 shows an axial view of the exemplary voltage transformer of FIG. 3.

Referring to FIG. 1, a film 1 which may be used for producing a capacitor, in particular for a voltage transformer as shown in FIG. 3, 4 comprises (FIG. 1) a base 2 essentially consisting of electrically insulating polymer material, with a surface which is partially covered by a coating of electrically conductive material. The film 1 forms a long strip which can, but which need not necessarily be of constant width. Its thickness is, for example, between 2 μm and 20 μm. The material of the base 2 is, e.g., polyethylene, polystyrole, polypropylene, polycarbonate, polyimide, PET, PEN, polyester, epoxy resin, polysulfone or a mixture of such polymers possibly also containing additives and suitable for forming a thin film with high dielectric strength. The coating is in the form of a single sequence of at least four but usually a much greater number of rectangular coated areas 3 which follow one upon the other in a longitudinal direction. The lateral boundaries of the coated areas 3 are spaced from the lateral edges of the film 1, i.e. the margins of the base 2, so the latter exhibits non-coated strips adjacent to its margins which extend over virtually a whole length of the film 1 without interruption. Subsequent coated areas 3 are in each case separated by a transverse interstice 4 or gap in the coating. As a consequence, the areas 3 are electrically insulated from each other.

Figure 2:
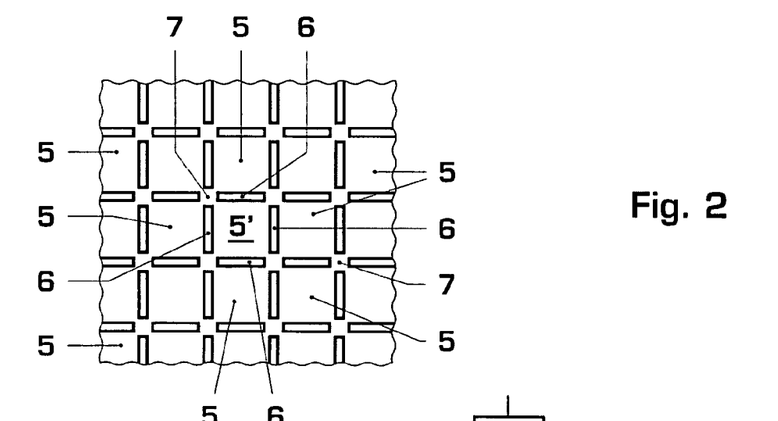
FIG. 2 shows enlarged a cutout from FIG. 1 as indicated by II.

The coating can include, (e.g. consist of) metal, and can be in particular a metallization applied by vapor deposition, but use of other electrically conductive materials beside metals, e.g., carbon or a semiconducting material, is also possible. The electrically conductive coating can be patterned as known per se (see, for example, EP 0 225 822 A1, the disclosure of which is hereby incorporated by reference in its entirety), that is, it can include (e.g., consist of), e.g., quadratic, patches 5, 5' (see FIG. 2 which shows an enlarged cutout II from FIG. 1) with adjacent patches 5, 5' separated by uncoated strips 6 and only connected by thin bridges 7 of coating at the corners. If a partial breakdown occurs at one of the patches, e.g., patch 5', the surrounding bridges 7 evaporate, thereby interrupting the electrically conductive connections of the patch 5' in question with its neighbours. Alternatively, a graded or uniform conductive coating can be used. The electrical conductivity of the coating may be relatively low as larger currents will normally be perpendicular, that is, its surface resistivity can be, for example, at least 1 Ω$_\square$ (Ohm-square).

The leftmost of the areas 3 in FIG. 1 which is electrically conductively connected to a lead 8 is relatively long. The lateral extension of the coated areas 3 can be constant throughout whereas their longitudinal extension decreases, in particular, substantially proportionally to a square root of the longitudinal position of the coated area 3 on the film 1. Alternatively, the lateral extension of the coated areas varies, e.g., increases by a constant increment from one area to the next. The rightmost of the areas 3 is connected to another lead 9.

The film 1 is suitable for forming—with its partially conductively coated surface facing inside—a cylindrical winding which can be used as a high voltage capacitor in an exemplary capacitive voltage transformer as shown in FIGS. 3, 4. This capacitor 10 is carried by a tube-shaped support 11 of electrically insulating material, e.g., fiber-enforced plastic on which the film has been wound and which in turn surrounds a conductor rod 12. A contact ring 13 which also surrounds the conductor rod 12 and contacts the same with elastic contact fingers is electrically conductively connected to the innermost of the conductively coated areas 3 via lead 9. The capacitor 10 also comprises as a separate first terminal electrode a measuring electrode 14 surrounding the winding and including (e.g., consisting of) metal, in particular, of aluminum foil. It is electrically conductively connected to the outermost of the conductively coated areas 3 by lead 8.

Alternatively, lead 8 is omitted and the measuring electrode merely capacitively coupled to the outermost electrode of the capacitor. It is possible to omit lead 9 as well but this can compromise measuring accuracy. The capacitor can alternately be wound directly onto the conductor rod with lead 8 and contact ring 13 omitted.

The measuring electrode 14 can be surrounded by a further tube-shaped support 15 carrying a further capacitor, a low voltage capacitor 16. It may be of a conventional design, (e.g., as described in EP 1 329 915 A1, the disclosure of which is hereby incorporated by reference in its entirety) including (e.g., consisting of) two films wound on the support 15 together, each with a contiguous electrically conductive coating at an inner surface, the coating covering an area extending essentially over the whole length of the winding in each case, where with a first one of the said films the said area extends to a first lateral edge which forms a first face of the winding and at the second film to an opposite second lateral edge which forms the opposite second face of the winding.

The first face is covered by a contact ring 17 which contacts the conductively coated area of the first film and is electrically conductively connected to the measuring electrode 14 whereas the second face is covered in the same manner by a contact ring 18 which contacts the conductively coated area of the second film and is grounded. The capacitance of low voltage capacitor 16 can be much larger than that of capacitor 10, (e.g., by a factor of between 100 and 10'000 which is at the same time the conversion factor of the voltage transformer). The measuring electrode 14 can be electrically conductively connected via the contact ring 17 to an evaluation circuit 19 which may be of known design and delivers an output signal corresponding to the potential of the measuring electrode 14 which reflects the potential of conductor rod 12.

It can be advantageous to use in both the high voltage capacitor 10 and the low voltage capacitor 16 the same material for the film or at least for its base, as in this case the influence, which variations of parameters like temperature or voltage may have on the electrical properties of the said capacitors, will be substantially the same and the conversion factor will remain practically unaffected, in particular, where they are arranged in close proximity of each other, e.g., immediately adjacent to each other. As a consequence, high measuring accuracies can be achieved which allows application of the transformer in fields with particularly stringent respective requirements like metering. The voltage transformer can be encapsulated in a casing of electrically insulating material for mechanical stabilization and protection.

Figure 5A:
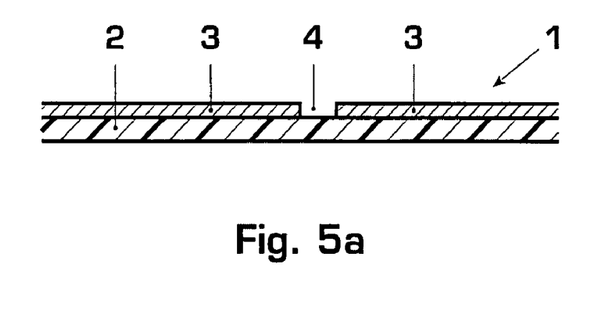
FIG. 5a schematically shows a partial longitudinal section of a film according to a first exemplary embodiment of the disclosure.
Figure 5B:
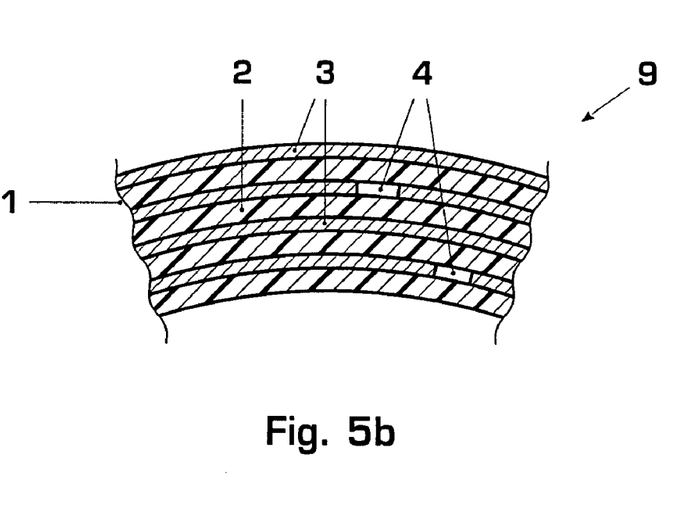

With the lengths of the areas 3 of the film 1 forming the capacitor 10 following the rule indicated above, every one of them extends over a certain constant angle, in particular, over slightly more than two turns of the capacitor 10, forming an electrode comprising two essentially parallel electrode layers. Subsequent interstices 4 can be slightly staggered (see FIGS. 5a, 5b). As a consequence, radial components of the electric field can be small in the neighbourhood of the interstices 4. Also, throughout every second winding of the film 1 both surfaces of the base 2 are adjacent to electrode layers pertaining to the same electrode as formed by one of the coated areas 3. Therefore the base 2 is not subjected to a strong and permanent electric field which is a further obstacle to an extension of any partial breakdown.

The width of the interstices 4 will have to be chosen large enough to prevent surface flashovers at the expected voltages. The interstices may, however, be much wider than this requirement necessitates and can e.g. extend over a complete turn of the winding or more. The risk of flashovers at the margins is generally quite small, the coated areas 3 being spaced from the lateral edges of the film 1. It is, however, possible to seal the winding there by welding or by covering it with resin or some other suitable material in order to protect the winding against humidity.

The width of the electrodes formed by the coated areas 3 can be constant as indicated by dashed lines in FIG. 3. However, it is possible to arrange the lateral extensions of the coated areas in such a way that they follow some non-constant, e.g., linearly decreasing function of the radius in order to influence, in particular, equalize the electric field distribution between the conductor rod 12 and the measuring electrode 14.

Beside the measuring electrode 14, the capacitor 10 may comprise a second terminal electrode which may also include (e.g., consist of) metal, in particular, aluminum foil and which surrounds the support 11 and is electrically conductively connected to contact ring 13. The coupling between a terminal electrode and an adjacent electrode of the winding can be via a lead or other electrically conductive connection or merely capacitive. On the other hand, a separate measuring electrode can be omitted and the outermost electrode of the winding directly connected to contact ring 17 and evaluation circuit 19.

As the electrodes in capacitor 10 are electrically insulated from each other they are on usually different floating potentials. It can be advantageous if the distances between subsequent electrodes are such that, with the expected maximum overall potential difference between the conductor and ground, the potential difference between the said electrodes is always below the minimum of the Paschen curve as in this case partial breakdowns of an insulating layer between two subsequent electrodes cannot occur.

Figure 6A:
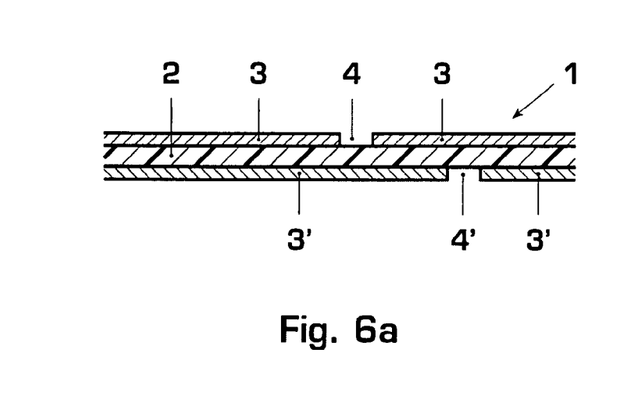
FIG. 6a schematically shows a partial longitudinal section of a film according to a second exemplary embodiment of the disclosure.
Figure 6B:
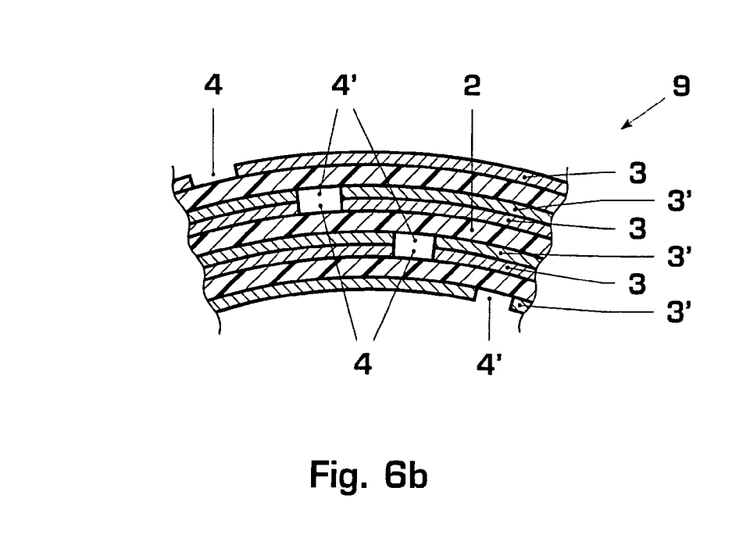

According to a second exemplary embodiment (FIGS. 6a, 6b) of a film according to the disclosure both surfaces of the film 1 are partially conductively coated surfaces, i.e., each is partially covered with an electrically conductive coating in the manner explained above. The film 1 is used to form a capacitor 10 like the one used in the voltage transformer of FIGS. 3, 4. The coated areas 3, 3' extend over slightly more than one turn of the winding which forms the capacitor 10. So, apart from a small overlap, every electrode includes (e.g., consists of) only one electrode layer. The interstices 4, 4' are staggered by the same amount and the coated area 3 and interstice 4 of the upper surface of a turn is congruent with the coated area 3' and the interstice 4' of the lower surface of a subsequent turn. Here, each electrode layer comprises two coated areas 3, 3' which are arranged one on top of another. They can be substantially congruent and virtually everywhere in mechanical and electrically conductive contact. As a consequence, eventual air inclusions between subsequent turns of the film 1 do not entail any risk of partial discharges as such inclusions are never exposed to a substantial electric field.

Figure 7A:
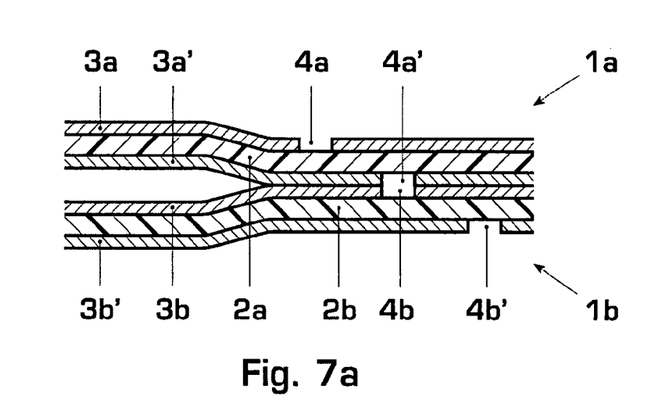
FIG. 7a schematically shows a partial longitudinal section of a superposition of two films, each according to the second exemplary embodiment of the disclosure.
Figure 7B:
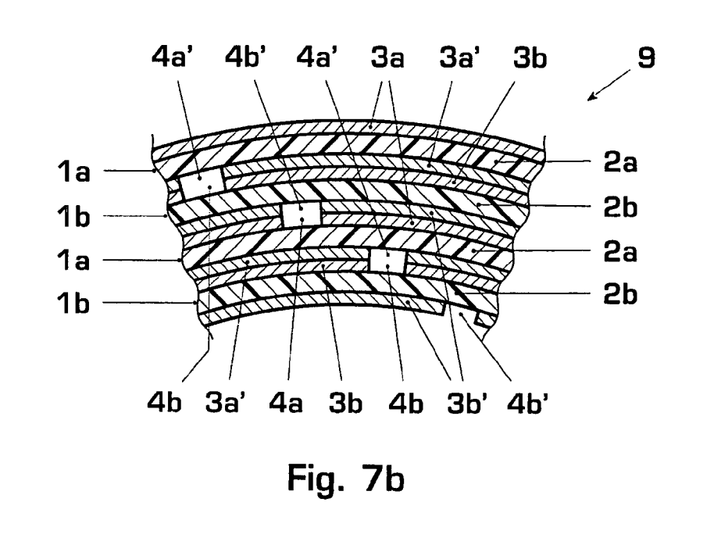

According to FIGS. 7a, 7b two films 1a, 1b, each conforming to the second embodiment described above, are arranged one on top of the other with bases 2a, 2b carrying congruent coated areas 3a', 3b and interstices 4a', 4b to form a superposition which again is wound into a capacitor 10 like the one apparent in FIGS. 3, 4. In a manner similar to the second embodiment, the coated areas 3a and interstices 4a on a first partially conductively coated surface on the upper side of the superposition, i.e., on the first such surface of the upper film 1a, of a turn are congruent with the coated areas 3b' and the interstices 4b', respectively, on a second partially conductively coated surface on the lower side of the superposition, i.e., on the second such surface of the lower film 1b, of the subsequent turn in each case.

There are, of course, many possibilities of forming capacitors in the form of a winding within the scope of the disclosure. E.g., several films, containing at least one film according to the disclosure and not excluding films without electrically conductive coating, may be arranged one on top of the other to form a superposition and the superposition wound into a capacitor according to the disclosure.

Figure 8:
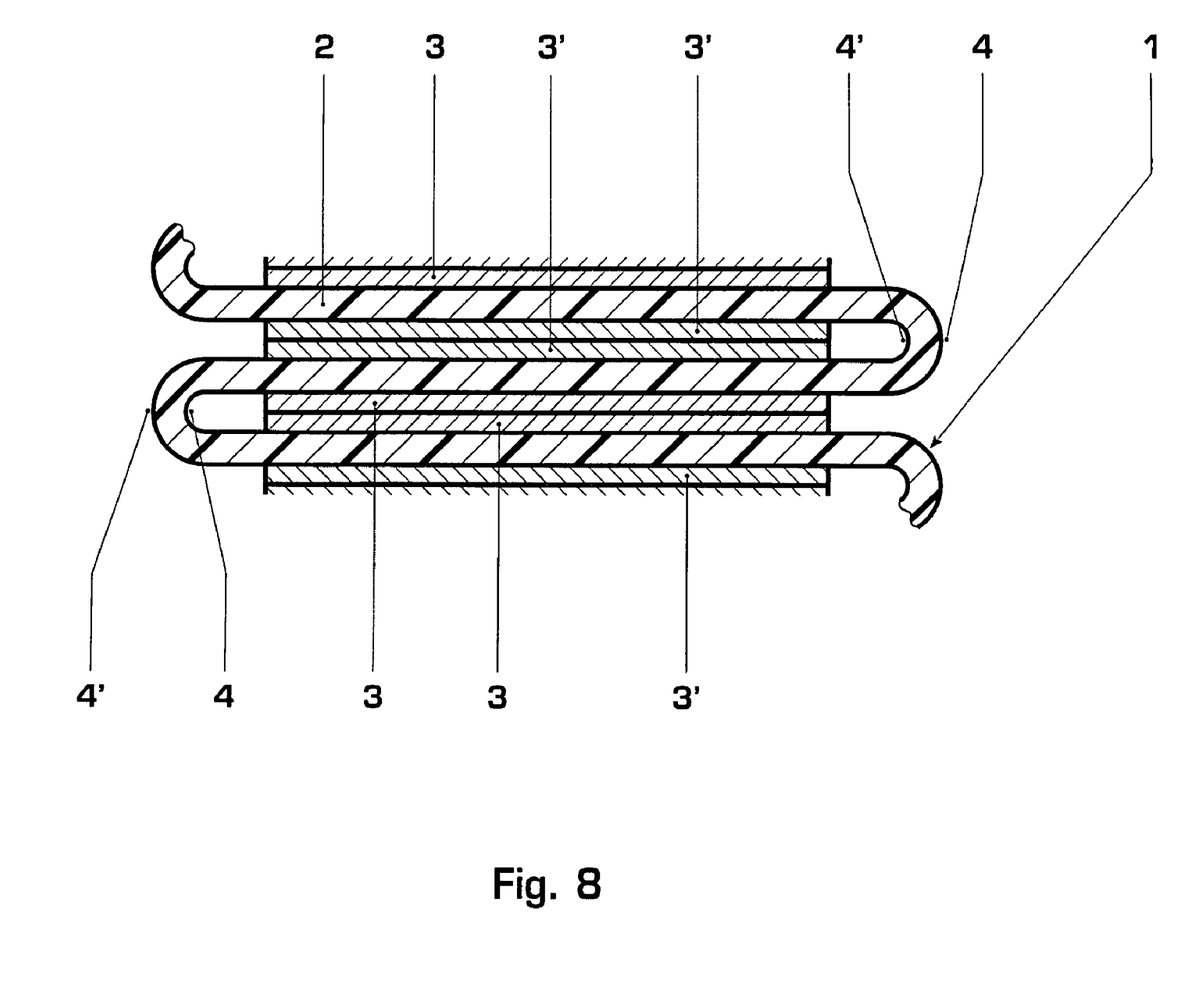

Apart from windings, it is possible to superpose subsequent sections of a film according to the disclosure or of a superposition of films comprising at least one film according to the disclosure into an inventive capacitor in some other way, e.g., by zigzag-folding of the film or superposition. In this way, an, e.g., parallelepipedic capacitor can be formed with the straight sections forming a stack as indicated in FIG. 8 where a film of fundamentally the same structure as the one shown in FIG. 6a can be used. However, all the coated areas 3, 3' have the same length, being somewhat shorter than a section such that in each case an interstice 4 or 4' extends over the fold connecting subsequent sections and areas adjacent to it. Here again every electrode comprises two substantially congruent coated areas 3, 3 or 3', 3' which are arranged one on top of the other. The film of FIG. 5a or the superposition of FIG. 7a and other films according to the disclosure or superpositions comprising such film may, with appropriate modifications, also be used in this way.

The capacitors are, for example, dry; that is, they do not contain impregnation fluids applied to the film during the manufacturing of the capacitor and having penetrated its base. Of course, the dimensions, shapes and arrangement of the coated areas and their electrical properties as well as the dimensions and properties of the base may vary widely depending on the specific purposes of the capacitor or other configuration for the production of which the film is to be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1, 1a, 1b film
2, 2a, 1b base
3, 3', 3a, 3a', 3b, 3b' coated area
4, 4', 4a, 4a', 4b, 4b' interstice
5, 5' patch
6 uncoated strip
7 bridge
8, 9 lead
10 (high voltage) capacitor
11 support
12 conductor rod
13 contact ring
14 measuring electrode
15 support
16 low voltage capacitor
17, 18 contact ring
19 evaluation circuit

What is claimed is:

1. A voltage transformer comprising:
  a high voltage capacitor and a low voltage capacitor series-connected to the high voltage capacitor, wherein the high voltage capacitor includes:
    at least one film with a base, which base comprises an electrically insulating polymer, and a partial coating of electrically conductive material, the partial coating being arranged on a first surface of the base, and the at least one film being windable or foldable in a longitudinal direction, wherein the partial coating forms on the first surface at least one sequence of conductively coated areas, each of the conductively coated areas being spaced from lateral edges of the base, the conductively coated areas following upon each other in the longitudinal direction of the film separated by non-coated interstices, and wherein subsequent film layers of at least one wound or folded film are arranged one on top of another, with conductively coated areas forming parallel electrode layers separated by non-coated interstices, and with the electrode layers forming a plurality of electrodes which are electrically insulated from each other; and
  a winding of the at least one film, with the subsequent film layers arranged one on top of another being formed by subsequent turns of the winding,
  wherein the low voltage capacitor includes at least two films, each with a base comprising an electrically insulating polymer and an electrically conductive solid foil arranged on top of the base, each solid foil being electrically insulated by the base, and
  wherein the low voltage capacitor coaxially surrounds the high voltage capacitor.

2. The voltage transformer according to claim 1, wherein the at least two films of the low voltage capacitor are arranged as alternating layers in a winding with the solid foils of the low voltage capacitor forming two electrodes, each extending contiguously over a length of the base of the low voltage capacitor, one solid foil comprising a first contact area exceeding the base in a longitudinal winding direction at an innermost turn of the winding of the low voltage capacitor and another solid foil comprising a second contact area exceeding the base in an outermost turn of the winding of the low voltage capacitor, one of the electrodes being configured to be contacted at the first contact area and another of the two electrodes being configured to be contacted at the second contact area.

3. The voltage transformer according to claim 1, wherein the low voltage capacitor comprises:
  at least one of the at least two films with a base comprising an electrically insulating polymer, the at least one film of the low voltage capacitor having a surface with an at least partial coating of electrically conductive material; and
  at least two electrodes which are electrically insulated from each other, the electrodes each being formed by at least one coating.

4. The voltage transformer according to claim 3, wherein the at least one film of the low voltage capacitor forms a winding and coatings forming the at least two electrodes extend contiguously over the length of the film of the low voltage capacitor, the at least two electrodes being configured to be contacted at opposite lateral faces of the winding.

5. The voltage transformer according to claim 1, wherein the base of the at least one film of the high voltage capacitor and the base of the at least one film of the low voltage capacitor consist of the same material.

6. The voltage transformer according to claim 1, wherein the base of the film of the high voltage capacitor comprises a material selected from the group consisting of: polyethylene, polystyrole, polypropylene, polycarbonate, polyimide, polyethyleneterephtalate, polyethylenenaphtalate, polyester, epoxy resin, and polysulfone.

7. The voltage transformer according to claim 1, wherein the partial coating of the film of the high voltage capacitor is selected from the group consisting of a metallization, a carbon and a semiconducting material.

8. The voltage transformer according to claim 1, wherein the partial coating of the film of the high voltage capacitor has non-uniform conductivity.

9. The voltage transformer according to claim 8, wherein the partial coating is patterned or graded.

10. The voltage transformer according to claim 1, wherein the film of the high voltage capacitor has a thickness between 2 µm and 20 µm.

11. The voltage transformer according to claim 1, wherein an extension of the conductively coated areas perpendicular to the longitudinal direction of the film of the high voltage capacitor is constant.

12. The voltage transformer according to claim 1, wherein the at least one film of the high voltage capacitor is windable or foldable such that the subsequent film layers of the at least one film are arranged one on top of another, and wherein at least one sector exists, which extends through all film layers and over a whole width of the film and which sector contains only non-coated interstices.

13. The voltage transformer according to claim 12, wherein a longitudinal extension of the conductively coated areas and/or a longitudinal extension of the non-coated interstices varies.

14. The voltage transformer according to claim 13, wherein the at least one film of the high voltage capacitor is windable, and the longitudinal extension of the non-coated interstices is constant.

15. The voltage transformer according to claim 13, wherein the at least one film of the high voltage capacitor is windable, and a longitudinal extension of consecutive non-coated interstices increases such that the sector has a cone-like shape.

16. The voltage transformer according to claim 13, wherein the at least one film of the high voltage capacitor is windable, and a longitudinal extension of conductively coated areas increases such that the sector has a rectangular shape.

17. The voltage transformer according to claim 1,
wherein the base of the high voltage capacitor has a second surface opposite the first surface, a partial coating of electrically conductive material being arranged on the second surface of the base of the high voltage capacitor and
wherein the coating forms on the second surface at least one sequence of conductively coated areas, each being spaced from lateral edges of the base of the high voltage capacitor, the conductively coated areas following upon each other in a longitudinal direction of the base of the high voltage capacitor separated by non-coated interstices.

18. The voltage transformer according to claim 1, wherein each electrode of the high voltage capacitor is formed by at least two subsequent film layers arranged one on top of another.

19. The voltage transformer according to claim 18, wherein the high voltage capacitor comprises:
two films, each with at least one partial coating of electrically conductive material, the two films being arranged one on top of another, with partial coatings facing each other.

20. The voltage transformer according to claim 18,
wherein the at least one film of the high voltage capacitor has a second surface opposite the first surface, a partial coating of electrically conductive material being arranged on the second surface of the base,
wherein the coating forms on the second surface at least one sequence of conductively coated areas, each being spaced from lateral edges of the base, the conductively coated areas following upon each other in a longitudinal direction of the base separated by non-coated interstices, and
wherein the coating on the first surface and the coating on the second surface of a film layer are in direct contact with one of the coating on the first surface and the coating on the second surface of a previous or a subsequent film layer, respectively.

21. The voltage transformer according to claim 1, wherein at least one electrode layer of the high voltage capacitor is made up of two conductively coated areas arranged one immediately on top of another such that the two conductively coated areas are in electrically conductive contact.

22. The voltage transformer according to claim 21, wherein two conductively coated areas making up an electrode layer are in each case congruent.

23. The voltage transformer according to claim 1, wherein the high voltage capacitor comprises:
at least one electrode with a sequence of at least two electrode layers arranged one on top of another and separated in each case by non-coated interstices.

24. The voltage transformer according to claim 23, wherein the at least one electrode comprises:
at least one continuous conductively coated area extending over a whole length of the electrode.

25. The voltage transformer according to claim 1, wherein the high voltage capacitor is a dry capacitor.

26. The voltage transformer according to claim 1, wherein the high voltage capacitor comprises:
a stack, with subsequent sections of the at least one film arranged one on top of another being formed by subsequent film layers of the at least one film folded in a zigzag manner.

27. The voltage transformer according to claim 1, wherein the electrically conductive solid foil is made of metal, metal alloy, or carbon.

28. A voltage transformer comprising:
a first capacitor including:
a winding of a film having a base with an electrically insulating polymer and a partial coating of electrically conductive material, the partial coating being arranged on a first surface of the base to form at least one sequence of conductively coated areas, each being spaced from lateral edges of the base, the conductively coated areas being separated from one another by non-coated interstices; and additional film layers with conductively coated areas forming parallel electrode layers separated by non-coated interstices and electrically insulated from each other; and a second capacitor of low voltage, series-connected to the first capacitor and coaxially surrounding the first capacitor, the second capacitor including:
at least two films, each with a base having an electrically insulating polymer and an electrically conductive solid foil arranged on the base, the electrically conductive solid foils of the at least two films being electrically insulated from each other.

* * * * *